(12) United States Patent
D'Souza et al.

(10) Patent No.: US 10,819,833 B2
(45) Date of Patent: Oct. 27, 2020

(54) DYNAMIC RE-ROUTE IN A REDUNDANT SYSTEM OF A PACKET NETWORK

(71) Applicant: Telefonaktiebolaget LM Ericsson (publ), Stockholm (SE)

(72) Inventors: Pramodh D'Souza, San Jose, CA (US); Sajjad Ahmed, Cupertino, CA (US); Prasanna Chalapathy, San Jose, CA (US); V. S. Jagannadham (Jack) Jonnalagadda, Menlo Park, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 121 days.

(21) Appl. No.: 16/072,457

(22) PCT Filed: May 6, 2016

(86) PCT No.: PCT/IB2016/052609
§ 371 (c)(1),
(2) Date: Jul. 24, 2018

(87) PCT Pub. No.: WO2017/144957
PCT Pub. Date: Aug. 31, 2017

(65) Prior Publication Data
US 2019/0028577 A1    Jan. 24, 2019

Related U.S. Application Data

(60) Provisional application No. 62/300,730, filed on Feb. 26, 2016.

(51) Int. Cl.
*H04L 12/46* (2006.01)
*H04L 29/14* (2006.01)
(Continued)

(52) U.S. Cl.
CPC .......... *H04L 69/40* (2013.01); *H04L 12/4641* (2013.01); *H04L 45/02* (2013.01); *H04L 45/22* (2013.01); *H04L 45/586* (2013.01)

(58) Field of Classification Search
None
See application file for complete search history.

(56) References Cited

U.S. PATENT DOCUMENTS

| 7,002,908 B1 | 2/2006 | Lund et al. | |
| 2003/0120788 A1* | 6/2003 | Berthaud | H04L 29/06 709/229 |

(Continued)

OTHER PUBLICATIONS

International Preliminary Report on Patentability for Application No. PCT/IB2016/052609, dated Jan. 24, 2018, 7 pages.
(Continued)

*Primary Examiner* — Kodzovi Acolatse
(74) *Attorney, Agent, or Firm* — Sage Patent Group

(57) ABSTRACT

A method and apparatus for enabling dynamic reroute in a redundant system is provided. A network device is operative to determine whether a state of a link that couples the first network device with a third network device is active. In response to determining that the state of the link is active causing a payload of a packet to be forwarded towards the third network device through the second network interface of the first network device based on a second IP address; and responsive to determining that the state of the link is not active causing the second payload to be forwarded towards the third network device through a third network interface of the second network device based on the second IP address.

9 Claims, 9 Drawing Sheets

(51) Int. Cl.
*H04L 12/751* (2013.01)
*H04L 12/707* (2013.01)
*H04L 12/713* (2013.01)

(56) References Cited

U.S. PATENT DOCUMENTS

| | | |
|---|---|---|
| 2005/0265228 A1 | 12/2005 | Fredette et al. |
| 2006/0168192 A1* | 7/2006 | Sharma .............. G06F 11/2028 709/224 |
| 2008/0101362 A1 | 5/2008 | Hu et al. |
| 2008/0151882 A1* | 6/2008 | Sanjay .................. H04L 45/00 370/389 |
| 2008/0181241 A1* | 7/2008 | Regan .................. H04L 45/02 370/401 |
| 2008/0225806 A1* | 9/2008 | Arian .................. H04W 8/065 370/338 |
| 2009/0268607 A1* | 10/2009 | Wang .................. H04L 45/02 370/218 |
| 2010/0274894 A1* | 10/2010 | Devaki .............. H04L 63/0272 709/224 |
| 2011/0211585 A1 | 9/2011 | Kodaka et al. |
| 2011/0238855 A1* | 9/2011 | Korsunsky .............. G06F 21/55 709/231 |
| 2012/0240185 A1* | 9/2012 | Kapoor .............. H04L 63/1425 726/1 |
| 2013/0003738 A1* | 1/2013 | Koganti .............. H04L 61/103 370/392 |
| 2013/0318219 A1* | 11/2013 | Kancherla .............. H04L 49/70 709/222 |
| 2014/0169154 A1* | 6/2014 | Chen ...................... H04L 45/58 370/219 |
| 2014/0211607 A1* | 7/2014 | Li .......................... H04L 49/552 370/219 |
| 2014/0334292 A1* | 11/2014 | Chang .................. H04W 24/04 370/225 |
| 2014/0362681 A1* | 12/2014 | Bahadur ................ H04L 45/22 370/219 |
| 2017/0214609 A1* | 7/2017 | Fujii .................. H04L 12/4641 |

OTHER PUBLICATIONS

International Search Report and Written Opinion for Application No. PCT/IB2016/052609, dated Nov. 15, 2016, 11 pages.
RFC 6870: Muley P., et al., "Pseudowire Preferential Forwarding Status Bit," Feb. 2013, 35 pages, Internet Engineering Task Force, Request for Comments: 6870.

* cited by examiner

DYNAMIC RE-ROUTE IN A REDUNDANT SYSTEM OF A PACKET NETWORK

CROSS-REFERENCE TO RELATED APPLICATIONS

This application is a National stage of International Application No. PCT/IB2016/052609, filed May 6, 2016, which claims the benefit of U.S. Provisional Application No. 62/300,730, filed Feb. 26, 2016, which is hereby incorporated by reference.

TECHNICAL FIELD

Embodiments of the invention relate to the field of packet networks; and more specifically, to the dynamic re-route in packet networks.

BACKGROUND

In a packet network, a subscriber is connected to a service via one or more network devices (NDs) of the packet network. For example, the ND where a provider's network and a customer's network are coupled are respectively referred to as PEs (Provider Edge) and CEs (Customer Edge or Customer Equipment). The PEs provide access to application servers which are part of the service of the subscriber. The application servers need to be protected from network attacks, as well as provide high resiliency to service outages. Optimal network connectivity is needed between subscriber CE devices and the application servers in order to provide availability in the packet data network.

In packet networks it is generally desirable to prevent service outages and/or loss of network traffic. By way of example, such service outages and/or loss of network traffic may occur when a network element fails, loses power, is taken offline, is rebooted, a communication link to the network element breaks, etc. In order to help prevent such service outages and/or loss of network traffic, the communication networks may utilize ND redundancy systems. Redundancy system aim at providing a high availability (HA) solution that increases the availability of network devices, and may optionally be used to provide geographical redundancy. Redundancy systems are commonly implemented through a mated pair of an active network device and a standby network device. The active network device handles current sessions using session state that is built up over runtime. The session data is synchronized or replicated from the active network element to the standby network element. The standby network element begins to handle the sessions when a switchover event occurs.

To deploy high available packet networks, an end to end redundant path connecting the CEs to the application servers in the network would be needed. However, the number of CEs increases exponentially with the increase in the number of subscribers resulting in complexities of the network paths connecting the CEs to the application servers being a challenge in providing high availability.

In a standard approach, technologies such as Ethernet LINE (i.e., ELINE, point to point pseudowires) or Ethernet Local Area Network (i.e., ELAN, virtual bridging with point to point pseudowires) can be deployed to tunnel CEs subscribers' traffic to the PEs and cross connect to the application servers. However, to implement redundancy, ELINE or ELAN technologies emphasize that CE and PE network devices need to support Label Distribution Protocol (LDP) PseudoWire (PW) signaling software (e.g., in compliance with IEEE Request For Comment (RFC) 6870). This limitation escalates when migrating to a new LDP software on already deployed large scale legacy CEs (for example the migration can be needed to reduce the cost of operation). Such a migration becomes very costly or sometimes impossible to perform for a large number of CEs (e.g., Millions of network devices). In particular, the CEs need to support LDP Pseudowire Preferential Forwarding Status Bit as defined in Request For Comment RFC 6870. In existing deployments, most CEs do not support LDP. Therefore the cost of upgrading the CEs to support LDP increases significantly due to the very high scale of current networks. Further, in some CEs the upgrade might not be possible due to hardware constraints (such as limited memory, limited CPU speed, etc.).

In another standard approach, subscriber traffic can be forwarded between the CE and the application servers through an IP tunnel such as standard GRE tunnel/MPLS tunnel. In this case the redundancy at the core can be implemented by Virtual Router Redundancy Protocol (VRRP). Hence the VRRP state becomes the application state at the core of the network. However, the challenge with this approach is the synchronization of the application state of the PEs with the Layer 2 states of the links that connect the PEs with the application servers since any reroute of traffic in case of switchover within the redundancy system causes the MPLS protocol to transmit reroute information towards each CE of the network device affected by the switchover, requiring the update of routing tables in each of these CEs.

SUMMARY

One general aspect includes a method in a first network device coupled with a second network device, where the first network device and the second network device are part of a redundancy system, and where the first network device is acting as an active network device in the redundancy system. The method includes receiving a first packet at a first network interface of the first network device, where the packet includes a first internet protocol (IP) header and a first payload, where the first network interface couples the first network device with a customer network device; decapsulating the first packet to retrieve the first payload, where the first payload includes a second payload, and a second header including a second IP address as a destination address, and where the second IP address is associated with a second network interface of the first network device and the second IP address is further associated with a third network interface of the second network device; determining whether a state of a link that couples the first network device with the a third network device is active; responsive to determining that the state of the link is active causing the second payload to be forwarded towards the third network device through the second network interface of the first network device based on the second IP address; and responsive to determining that the state of the link is not active causing the second payload to be forwarded towards the third network device through the third network interface of the second network device based on the second IP address.

One general aspect includes a first network device to be coupled with a second network device, where the first network device and the second network device are part of a redundancy system, and where the first network device is acting as an active network device in the redundancy system. The first network device including one or more processors and a non-transitory computer readable storage medium, said non-transitory computer readable storage medium containing instructions, which when executed by the one or more processors, causes the first network device to receive a first packet at a first network interface of the first network device, where the packet includes a first internet protocol (IP) header and a first payload, where the first network interface couples the first network device with a customer network device. The first network device is further to decapsulate the first packet to retrieve the first payload, where the first payload includes a second header and a second payload, and where the second payload includes a second IP address as a destination address, where the second IP address is associated with a second network interface of the first network device and the second IP address is further associated with a third network interface of the second network device. The first network device is further to determine whether a state of a link that couples the first network device with the a third network device is active. Responsive to determining that the state of the link is active, the first network device is further to cause the second payload to be forwarded towards the third network device through the second network interface of the first network device based on the second I address. Responsive to determining that the state of the link is not active, the first network device is further to cause the second payload to be forwarded towards the third network device through the third network interface of the second network device based on the second IP address.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1A:
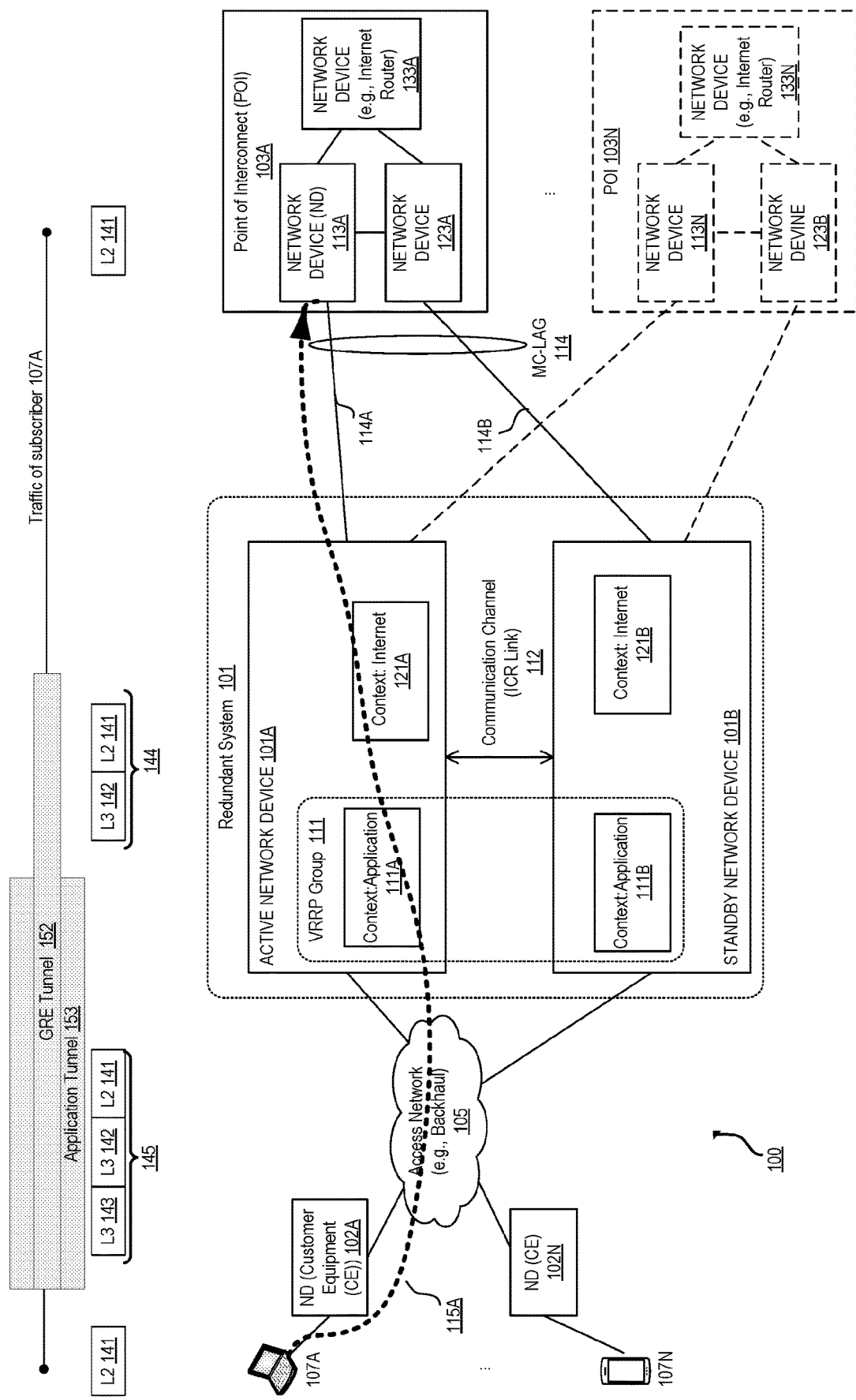
FIG. 1A illustrates an exemplary block diagram of a packet network for enabling dynamic reroute of upstream traffic in accordance with some embodiments of the invention.

The following description describes methods and apparatus for enabling dynamic re-route. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

The embodiments described herein present a seamless architecture for high availability of an end-to-end connectivity of a subscriber to a service provided through a packet network. A subscriber is connected to the service via one or more network devices (NDs) of the packet network. Some NDs of the packet network provide support for implementing VPNs (Virtual Private Networks) (e.g., Layer 2 VPNs and/or Layer 3 VPNs). For example, the ND where a provider's network and a customer's network are coupled are respectively referred to as PEs (Provider Edge) and CEs (Customer Edge or Customer Equipment). The embodiments presented herein achieve high availability of a provider's network in part through the use of a redundant system for implementing the PEs. In these embodiments reroute of traffic is performed dynamically such that when a switchover occurs within the redundant system a reroute of data is performed without causing any CE of the packet network to update forwarding information. Subscribers traffic is steered towards an active network device (including a gateway application of the service) of a redundant group of network devices by tunneling the data packets through a first application tunnel coupling the CE with the PE redundant system. Upon receipt of the tunneled packets, the PE decapsulates the packets to retrieve the payload, which also includes encapsulated packets. In some embodiments, the encapsulated packets are destined to an anycast IP addresses for Layer 2 VPN service endpoint and are used to forward the packets towards the applications server either by passing through the active network device or the standby network device of the redundant group. The forwarding of the packets is performed dynamically based on an event that tracks the state of links connecting the active network device with the application server. In some embodiments, this event can also be user defined.

Figure 1B:
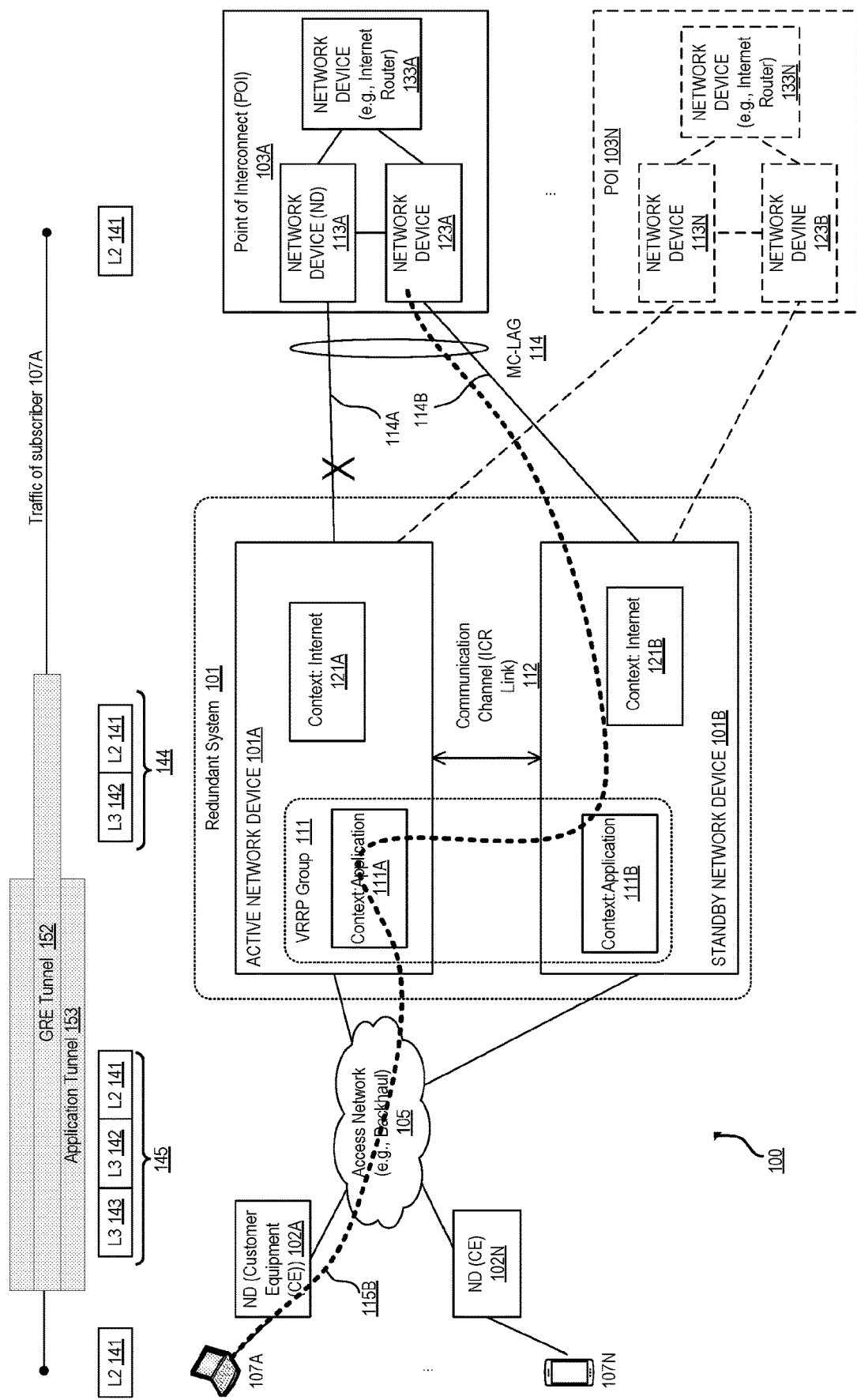
FIG. 1B illustrates an exemplary block diagram of a packet network for enabling dynamic reroute of upstream traffic in accordance with some embodiments of the invention.

FIGS. 1A-B illustrate block diagrams of an exemplary network for enabling high availability of a service according to some embodiments. Network 100 includes one or more end users' devices 107A-N belonging to subscribers to a service. End users' devices are electronic devices enabling one or more subscribers to access services at applications servers through the network 100. The end user's devices 107A-N are operative to transmit and receive data packets through the network. Examples of suitable end user devices include, but are not limited to, servers, workstations, laptops, netbooks, palm tops, mobile phones, smartphones, multimedia phones, tablets, phablets, Voice Over Internet Protocol (VOIP) phones, user equipment, terminals, portable media players, GPS units, gaming systems, set-top boxes, and combinations thereof. End users' devices 107A-N access content/services provided over the Internet and/or content/services provided on virtual private networks (VPNs) overlaid on (e.g., tunneled through) the Internet. The content and/or services are typically provided by one or more provider end stations (e.g., application servers) belonging to a service or content provider. Examples of such content and/or services include, but are not limited to, public webpages (e.g., free content, store fronts, search services), private webpages (e.g., username/password accessed webpages providing email services), and/or corporate networks over VPNs, etc.

As illustrated, end users' devices 107A-N are communicatively coupled (e.g., through a wired and/or wireless customer premise equipment (CE); e.g., NDs 102A-N) to access network 105 which includes access network devices (e.g., a backhaul network). Access network devices can be communicatively coupled to provider edge network devices (e.g., network devices 101A and 101B) of the redundancy system 101. The provider edge network devices may be communicatively coupled through point of interconnect (POI) network devices 103A-B to one or more provider end stations or application servers (not illustrated). While in FIGS. 1A-B two end users devices are illustrated (107A and 107N), the provider edge network devices may host on the order of thousands to millions of wire line type and/or wireless end users' devices, although the scope of the invention is not limited to any known number.

In one embodiment, network devices 101A and 101B form redundancy system/cluster 101 (which may be referred to as Inter-Chassis Redundancy (ICR) system). In a redundancy system, there are typically two network devices. There may, however, be more than two network devices. During normal operation, one network device operates in an active state (herein referred to as active network device (ND) 101A) while the other operates in a standby state (herein referred to as standby ND 101B). The active ND is responsible for handling network traffic with a plurality of other network devices (e.g., end users' devices 107A-N), including, for example, allocating Internet Protocol (IP) addresses to such devices. During a switchover event (herein referred to simply as a "switchover"), the active and standby network devices switch roles (e.g., the active network device becomes the standby network device, and the standby network device becomes the active network device). While in some embodiments, the active network device and the standby network device may be identical in terms of physical capabilities and software (e.g., memory size, CPU power, etc . . . ); in other embodiments, each network device may have different resource and physical capabilities. In some embodiments, Virtual Router Redundancy Protocol (VRRP) can be implemented on each one of the network devices of the redundancy system 101 and define a VRRP group. VRRP provides for automatic assignment of available Internet Protocol (IP) network devices to participating hosts. This increases the availability and reliability of routing paths via automatic default gateway selections on an IP subnetwork. In other embodiments, other redundancy protocols may be used without departing from the scope of the present embodiments (for example proprietary protocols may be used).

Each one of ND 101A and ND 101B is connected using a Multi-Chassis Link Aggregation Group (MC-LAG) 114 to a point of Interconnect (POI) 103A. The POI 103A may include one or more network devices and is operative to couple the PE with application servers. In some embodiments, the POIs are Layer 2 (L2) switching nodes used to shield and provide resiliency to the application servers. In order to provide better resiliency at the POI, Multi-Chassis Link Aggregation Group (MC-LAG) (e.g., MC-LAG 114 which includes links 114A and 114A) is configured at each POI to connect to ND 101A and 101B. While the present embodiments will be described with reference to POI 103A including a redundant system (e.g., network device 113A and 123A) for providing increased availability at the POI; in other embodiments, the POI may include a single network device to which each of the network devices ND 101A and 101B are connected. The operations described herein will still apply in this scenario. Furthermore, each of the NDs 101A and 101B may be coupled to more than one POI (e.g., N number of POIs 103A to 103N).

While the redundant system 101 may be operative to couple multiple subscribers with the service provider and receive traffic for each of these subscribers, in a spirit of simplification of the description the following paragraphs will describe the case of traffic transmitted and received from a single exemplary subscriber user device 107A. Layer 2 subscriber traffic 115 is forwarded from CE 102A towards the application servers of the service through the redundant system 101 and the POI 103A. The layer 2 traffic is tunneled from the CE 102A to the POI 103A. Such subscriber traffic 115 from subscriber 107A can be referred to as Layer 2 VPN traffic. A gateway application (e.g., a service) runs in a redundant mode on the redundant system (e.g., the gateway application runs as part of a first context 111A of ND 101A as well as part of a second context 111B of ND 101B). The gateway application uses a separate tunnel to forward subscriber traffic between CE 102A and Redundant System (RS) 101. In some embodiments, as discussed above, VRRP can be used to provide management of RS 101 in particular of the redundant gateway application. In these embodiments, the active gateway application runs on the network device which is VRRP active thus the state of the gateway application is identical to the VRRP state of each network device. In some embodiments, the gateway application may be operative to deduce an active or standby role; for example when another redundancy protocol is used.

Thus the subscriber's traffic which includes an exemplary packet 141 is encapsulated with successive Internet protocol (IP) headers, where each one of the IP headers is associated with a corresponding tunnel. For example packet 141 is encapsulated with a first IP header 143, which is used to route the packet towards the context application 111A, and further encapsulated with a second IP header 142 which is used to route the packet towards the context internet 121A of the redundant system 101. Thus, IP destination address of the packets of the first IP header (143) is selected from a first IP routing space of the ND that provides reachability from the CE 102A to the RS 101. The IP routing space that has reachability to the RS is referred to as "context:Application." In general context refers to a reachability of a single IP routing space. Furthermore, IP destination address of the second IP headers (e.g., 142) of the packets (e.g., 141) received from subscriber 107A is selected from a second IP routing space which is a routing space of the ND 101A that has reachability to the POI 103A (for enabling a Layer 2 handoff). This second IP routing space which provides reachability to the POIs is referred to as "context:Internet."

In some embodiments, as illustrated in FIG. 1B, ND 101A which includes the active gateway application (i.e., context: Application 111A) may not have reachability to POI 103A (e.g., a failure may occur in the link between the active ND and the POI). Therefore the present embodiments provide a solution to redirect the traffic to the ND with reachability to the POI, here ND 101B. In addition, the traffic from the POI destined towards the CE's needs to be directed to the active gateway application. The present embodiments provide a solution to redirecting traffic to the active gateway application when the traffic is sent from the POI towards subscribers when a link failure occurs between the POI and the active network device.

The embodiments described herein achieve steering of traffic towards an active application (e.g., a gateway application) using anycast IP addresses for Layer 2 (L2) VPN service endpoint. The steering of traffic is performed at least in part by modifying the routing table on either a first network device or a second network device dynamically based on an event that tracks the state of Layer 2 links connecting the devices to the POI. Thus in order to provide dynamic reroute of traffic from the active network device 101A towards the standby network device when a link failure occurs between the active network device and the POI 103A, each context:Application of a ND (in particular context application 111A of ND 101A) is provisioned with routes towards virtual network interfaces of each one of the devices. On each context:Application of a ND, a route is installed to reach its context:Internet, or alternatively to reach the peer ND in the redundant system 101. The routing module in the context:Application will add these routes when the ND is active (e.g., ND 101A). Thus, the routing module of each ND tracks the redundancy state (e.g., a VRRP state of the ND). On the standby ND (e.g., ND 101B), the context:Internet routes to the active ND's context:Internet through a L3 link. These routes are learnt via an IGP (e.g., OSPFv2) in the context:Internet.

For example, context application 111A is provisioned with routes towards a first loopback interface associated with ND 101A, where the address associated with the loopback interface is part of the routing space of the Internet context 121A. Further context application 111A is provisioned with another route towards a second loopback interface of ND 101B, where the address associated with the loopback interface of ND 101B is the same as the address associated with the loopback interface of ND 101A and is part of the routing space of context internet 111A and 111B associated with POI 103A.

Thus, in the context:Internet 121A and 121B on each one of the active and standby NDs, a loopback interface (e.g., Layer 3 virtual network interface) is provided per remote POI (for example there is a loopback interface in each of ND 101A and ND 101B associated with POI 103A and another loopback interface in each of ND 101A and ND 101B associated with POI 103B). The loopback interface is introduced to proxy the L2 port where layer 2 services are terminated. The same loopback address is used for a POI on both the NDs.

In order to provide high availability through reroute of the traffic, the context:Application of each network device tracks a state of the link coupling the network device with the respective POI. For example context application 111A tracks the state of the link 114A. The state of the link is an indication of whether the link is active and therefore can receive traffic or has failed and cannot forward traffic towards the POI 103A. In some embodiments, the state of the link can be referred to as the 'L2 Service State'. When the link 114A is part of a MC-Lag (e.g., MC-LAG 114) the state of the link can be determined based on the Link Aggregation Control Protocol (LACP). In addition the gateway application 111A tracks the network interface to which to forward the traffic (i.e., the next-hop). In some embodiments the network interface can be either the interface at the context internet 121A or at the context internet 121B depending on whether the link 114A is active or not. Thus the routes between the CEs and the POIs will be installed through the active network device 101A (i.e., through an interface of the context internet 121A) when the 'L2 Service State' is up (or set) for the link coupling ND 101A with the corresponding POI 103A.

The operations in the flow diagrams will be described with reference to the exemplary embodiments of FIGS. 1A-B. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 2:
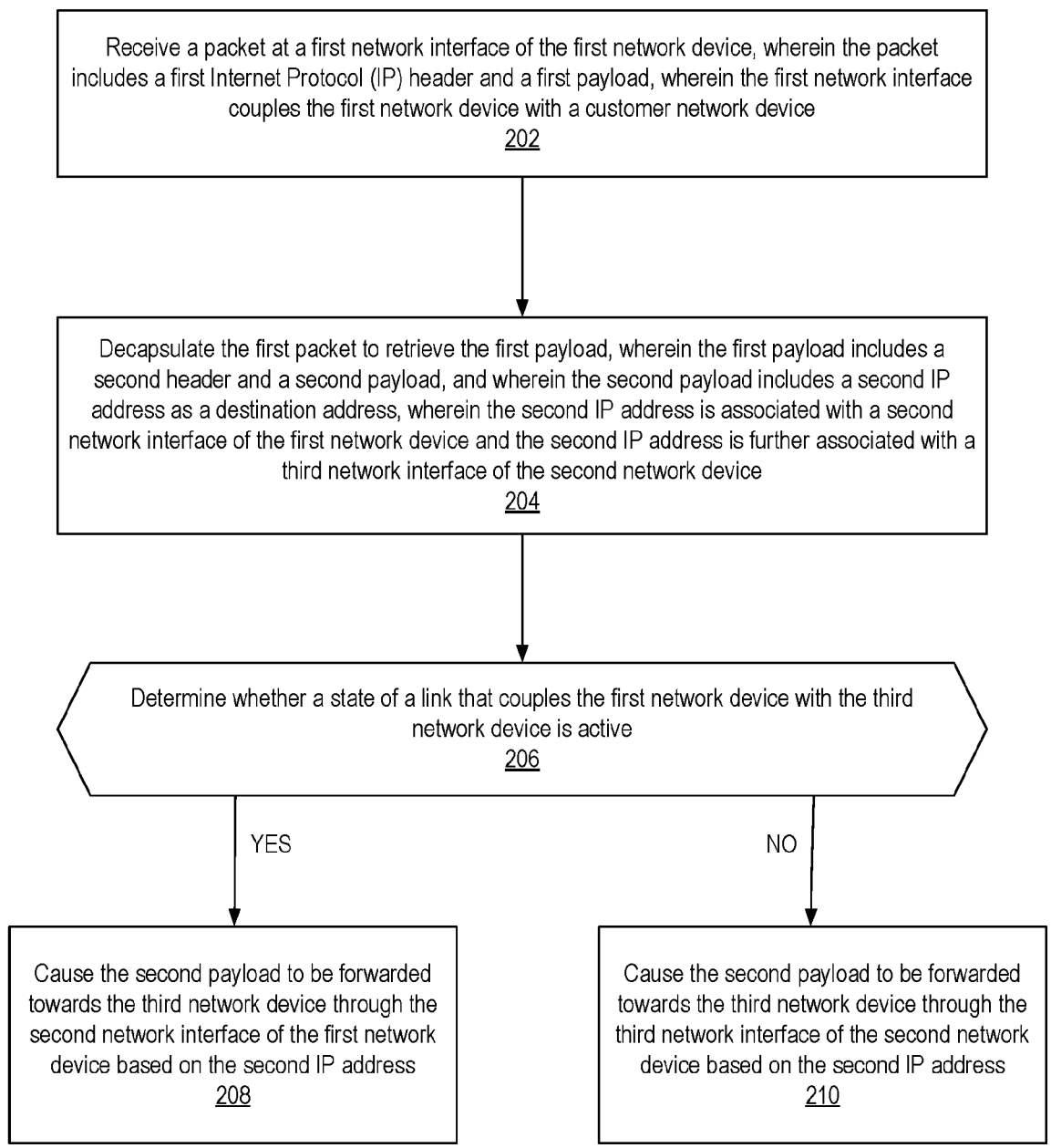
FIG. 2 illustrates an exemplary flow diagram of operations performed in a network device for enabling a dynamic reroute of upstream traffic in a packet network in accordance with some embodiments of the invention.

FIG. 2 illustrates an exemplary flow diagram of operations performed in a network device for performing dynamic reroute of traffic for enabling high availability in a network in accordance with some embodiments. The route between the CEs (e.g., CE 102A) and the POIs (e.g., POI 103A) is dynamically chosen based on the state ('L2 Service State') of the link coupling the PEs (i.e., the active device of the PE, ND 101A) with the POIs. Thus at operation 202, ND 101A, which is acting as the active network device of the RS 101, receives a packet 145 at a first network interface, wherein the packet 145 includes a first Internet Protocol (IP) header 143 and a first payload 144, wherein the first network interface couples the first network device with a customer network device (e.g., CE 102A). Flow then moves to operation 204, at which ND 101A decapsulates the first packet 145 to retrieve the first payload 144. The first payload includes a second payload 141 and a second header 142 including a second IP address as a destination address. The second IP address is associated with a second network interface of the first network device in addition to being associated with a third network interface of the second network device. As discussed above, in some embodiments, the second network interface of ND 101A is a virtual network interface (e.g., loopback interface of ND 101A) and the second address associated with this interface is part of the routing space defined for context internet 121A. The third network interface of ND 101B is a virtual network interface (e.g., loopback interface of ND 101B) and the address associated with this interface is part of the routing space defined for context internet 121A. The same address is associated with both network interfaces (second network interface of ND 101A and third network interface of ND 101B).

Flow then moves to operation 206, at which ND 101A determines whether a state of a link that couples the first network device with a third network device is active. Further the ND 101A may determine whether the destination address of the packet is reachable through the first network device 101A. In some embodiments, the context application 111A determines the state of the link 114A coupling ND 101A with POI 103A. In an exemplary embodiments, when link 114A is part of MC-LAG 114, the state of the link ("L2 service state") is determined based on LACP.

Flow then moves to operation 208, at which in response to determining that the state of the link is active (e.g., as illustrated in FIG. 1A, link 114A is active), the second payload 141 is forwarded towards the third network device POI 103A through the second network interface of the first network device ND 101A based on the second IP address. Thus if the link 114A is active and the POI is reachable through that link, the packet is routed through the current active ND to its next hop towards POI 103A. The next-hop here being a virtual interface of the active ND 101A, at the context internet 121A (e.g., loopback address of ND 101A). As illustrated in FIG. 1A, the traffic 115A received from CE 102A is routed from "context:Application" 111A of the active ND 101A towards "context.Internet" 121A to be forwarded towards the active link 114A and POI 103A.

The flow of operations then moves to operation 210, at which in response to determining that the state of the link is not active (e.g., as illustrated in FIG. 1B, link 114A is not active), the second payload 141 is forwarded towards the third network device POI 103A through the third network interface of the second network device ND 101B based on the second IP address. Thus, when the link 114A is not active, the packet 141 is routed through the adjacent ND 101B towards the next hop of the adjacent ND (i.e., the virtual interface at context internet 121B which is provisioned with the same IP address as the virtual network interface of context internet 121A) to be forwarded to POI 103A through the link 114B. In some embodiments, for the active context:Application to route through the standby context:Application, an L3 link (communication channel 112) is added between the active and standby ND in the context:Application.

Figure 3A:
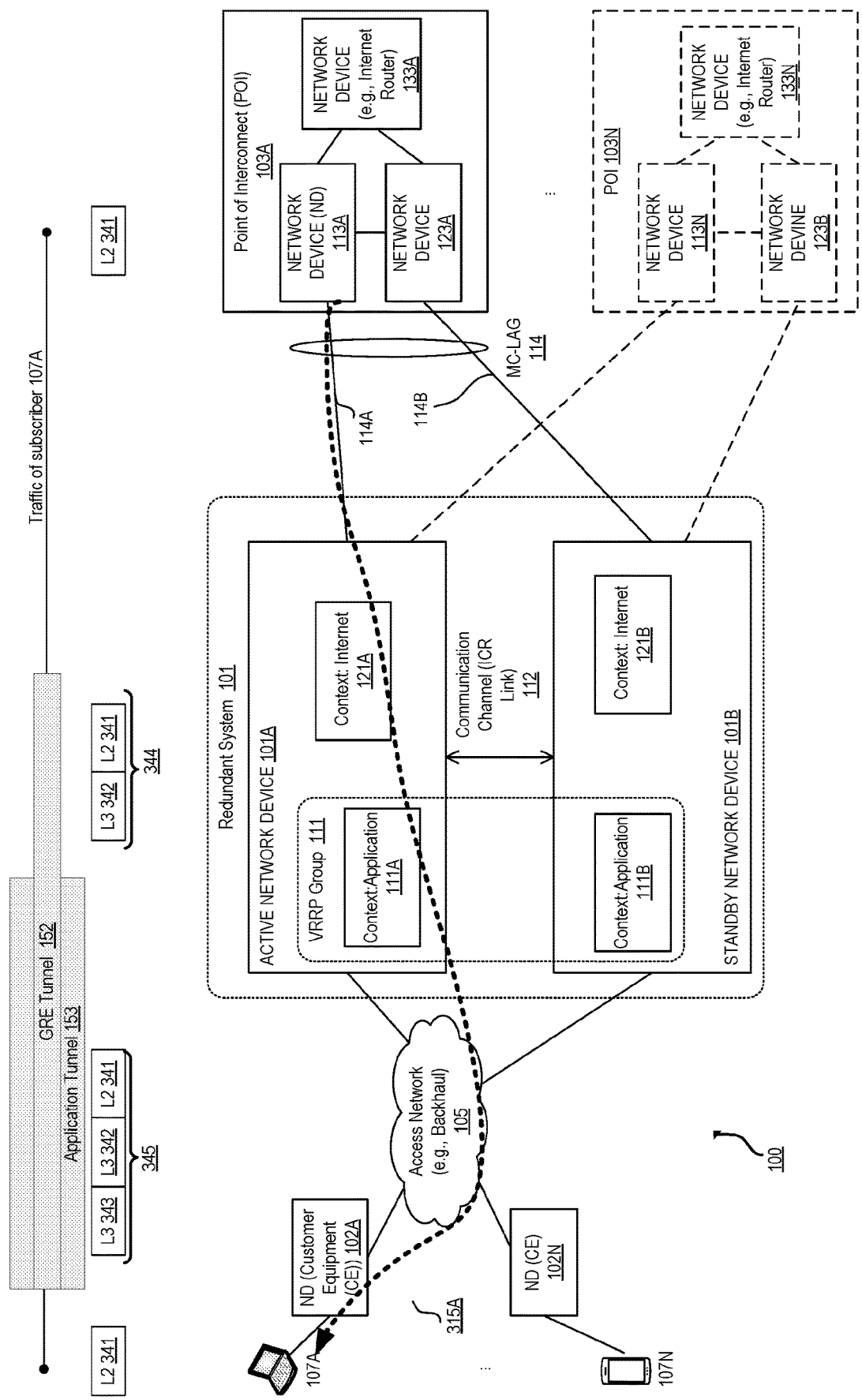
FIG. 3A illustrates an exemplary block diagram of a packet network for enabling dynamic re-route of packets of downstream traffic in accordance with some embodiments of the invention.

FIG. 3A illustrates an exemplary block diagram of downstream traffic forwarded in a packet data network in accordance with some embodiments. In order to provide high availability of the packet network 100 at the provider edge 101, the transport protocol's (e.g., GRE) endpoints for each of the subscribers are advertised (e.g., they can be advertised as summaries/aggregates) in the context:Application towards the backhaul. On each context:Internet of a ND, an aggregate route is installed to reach its context:Application. The routing module in the context:Internet will add these routes when the ND is active (e.g., ND 101A). Thus, the routing module tracks the redundancy state (e.g., VRRP state) to determine when to install the routes in forwarding tables of the ND. On the standby ND (e.g., ND 101B), the context:Internet routes to the active ND's context:Internet are transmitted through a L3 link. These routes are learnt via an IGP (e.g., OSPFv2) in the context:Internet.

Figure 3B:
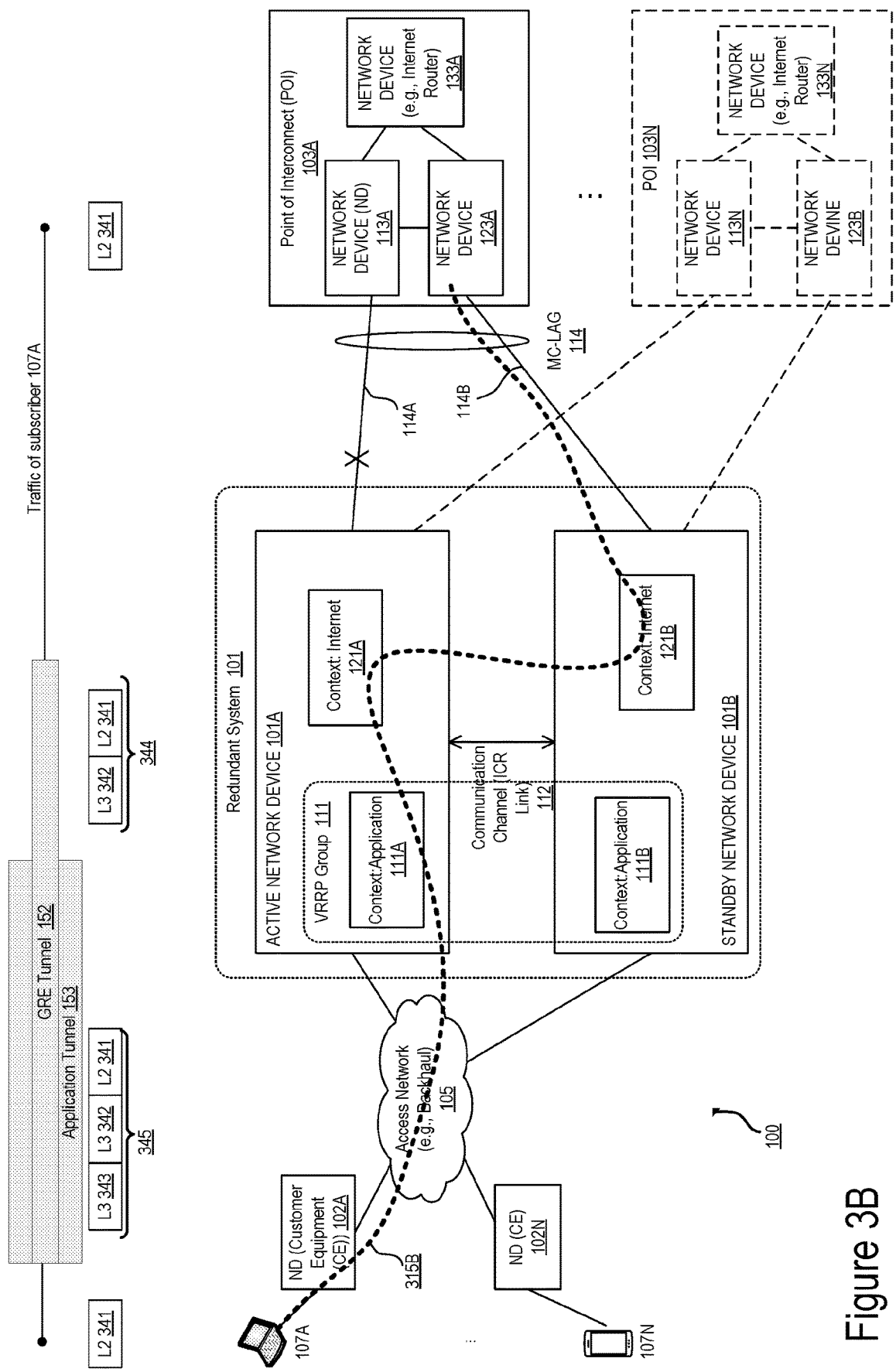
FIG. 3B illustrates an exemplary block diagram of a packet network for enabling dynamic re-route of packets of downstream traffic in accordance with some embodiments of the invention.

The operations in the flow diagram of FIG. 4 will be described with reference to the exemplary embodiments of FIGS. 3A-B. However, it should be understood that the operations of the flow diagrams can be performed by embodiments of the invention other than those discussed with reference to the other figures, and the embodiments of the invention discussed with reference to these other figures can perform operations different than those discussed with reference to the flow diagram.

Figure 4:
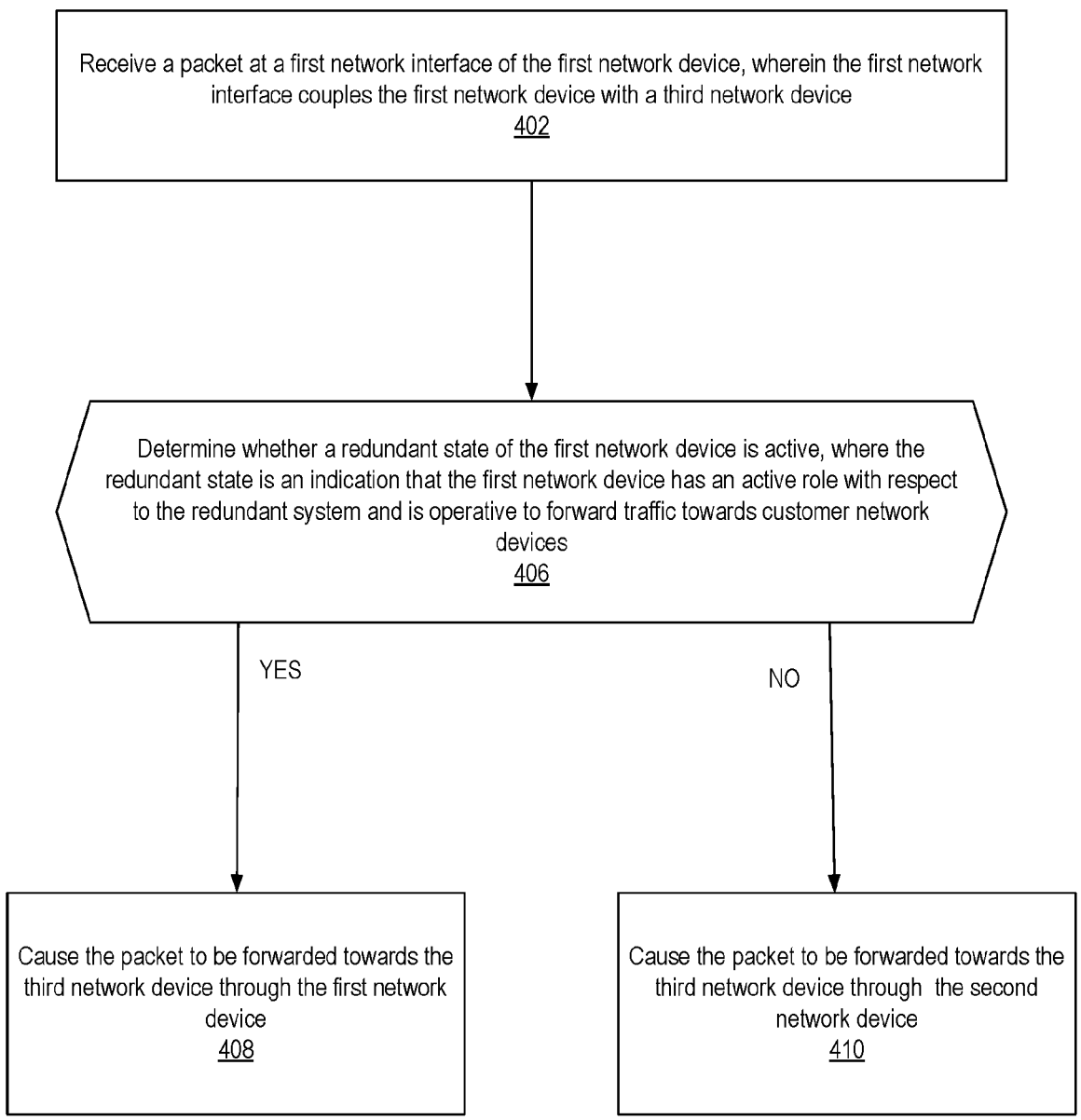
FIG. 4 illustrates an exemplary flow diagram of operations performed in a network device for enabling a dynamic reroute of downstream traffic in accordance with some embodiments of the invention.

FIG. 4 illustrates an exemplary flow diagram of operations performed in a network device for enabling a dynamic reroute of upstream traffic towards a CE in accordance with some embodiments. The dynamic reroute of the traffic received from POIs and destined to the one or more subscribers 107A-N is generalized to take the next-hop, when it reaches the PE, based on an Application State (i.e., the redundancy state of the network device receiving the traffic (e.g., the VRRP state)). Thus depending on the state of the application (which is some embodiments can be equivalent to the state of the ND with respect to the redundancy system), the traffic may be forwarded through the ND receiving the traffic or through the peer ND. At operation 402, the network device (e.g., ND 101A) receives a packet 341 at a first network interface of the first network device, wherein the first network interface couples the first network device ND 101A with a third network device POI 103A. Flow then moves to operation 404, at which the ND (e.g., 101A) determines, whether the application state is set. In some embodiments, the application state is determined based on the role assumed by the device within the redundancy system. For example when the ND is assuming an active role, the state of the context:application is active indicating that the applications and/or services running on the active ND are available to process and forward traffic. In other embodiments, another type of event can be defined by a user/administrator that could trigger the dynamic reroute of traffic towards the peer ND of the redundant system.

When the state of the context application is determined to be active, flow moves to operation 406, at which the packet is routed through the current ND to its next hop towards CE 102A. As illustrated in FIG. 3A, the traffic 315A received from POI 103A is routed from "context:internet" 121A of the active ND towards "context.Application" 111A and towards the CE 102A as the state of ND 101A is active.

When the state of the context application is determined to be not active (e.g., the ND is in a standby mode or the ND is in the process of switching over to a standby), flow them moves to operation 410, at which the packet is routed through the adjacent/peer ND towards the next hop of the adjacent ND. As illustrated in FIG. 3B, given that the state of ND 101B is standby, the traffic 315B received from POI 103A is routed from "context:internet" 121B of the standby ND 101B towards "context.internet" 121A of the active ND 101A and towards the CE 102A through the context application 111A.

In some embodiments, when a switchover in the redundant system occurs (e.g., the switchover can be due to a failure or a manual switchover planned by an administrator) and the static route in context:internet is withdrawn on the active network device due to the detection of the defined event (e.g., by the determination that an application state is not active), the static route is installed on the peer ND (i.e., on the standby ND which is switching to an active role) and is re-distributed via a routing protocol (e.g., via OSPF). In these embodiments, there may be a small window of time during which there is no route available to forward traffic due to time the routing protocol takes to converge.

This small window of time may cause an interruption of services at the PE (as there will be no connectivity). In order to prevent this scenario, a Shorter prefix (e.g., a less specific prefix) can be installed. For example, a prefix that is not tracked by the user defined event and is directed towards the context:application on the same ND (i.e., the context:application of the ND receiving the traffic and which is switching to the standby role). This keeps the service from being torn down until the more specific routes are learnt via the convergence of the routing protocol (e.g., OSPF or any other routing protocol).

The embodiments described herein provide ELINE redundancy solution without signalling the failure to the customer equipment devices. In some embodiments, the ELINE redundancy solution is achieved without explicit ELINE redundancy configuration. The embodiments, present Application or layer 2 service state driven routing where the Application or L2 service state in itself does not affect the routing topology (link state or otherwise). The proposed embodiments require no changes in software on the subscriber customer equipment. The present embodiments provide a seamless solution for enabling dynamic reroute of traffic in case of failure at a redundant system.

Architecture

Figure 5A:
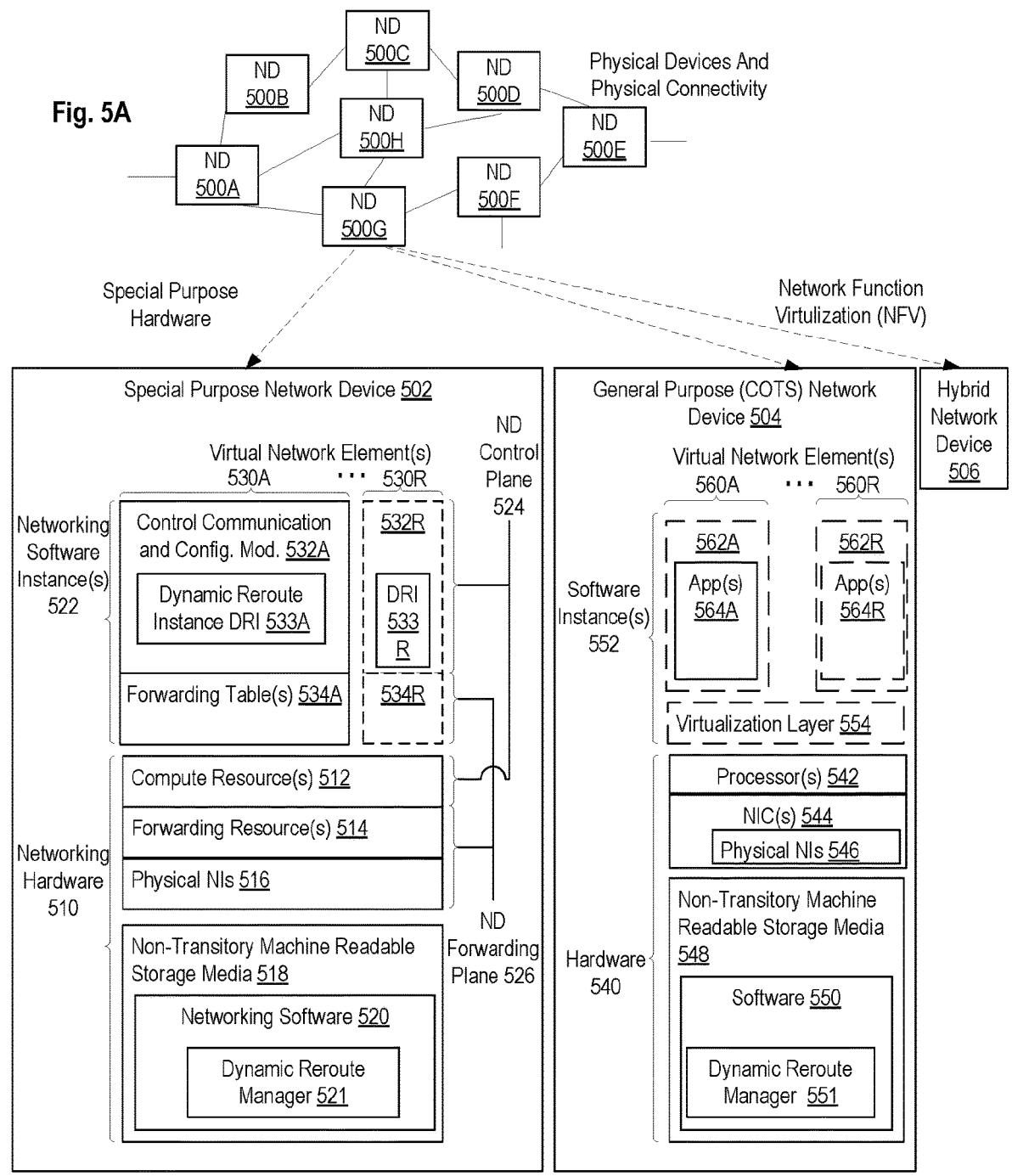
FIG. 5A illustrates connectivity between network devices (NDs) within an exemplary network, as well as three exemplary implementations of the NDs, according to some embodiments of the invention.

FIG. 5A illustrates connectivity between network devices (NDs) within an exemplary network, as well as three exemplary implementations of the NDs, according to some embodiments of the invention. FIG. 5A shows NDs 500A-H, and their connectivity by way of lines between 500A-500B, 500B-500C, 500C-500D, 500D-500E, 500E-500F, 500F-500G, and 500A-500G, as well as between 500H and each of 500A, 500C, 500D, and 500G. These NDs are physical devices, and the connectivity between these NDs can be wireless or wired (often referred to as a link). An additional line extending from NDs 500A, 500E, and 500F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application-specific integrated-circuits (ASICs) and a special-purpose operating system (OS); and 2) a general purpose network device 504 that uses common off-the-shelf (COTS) processors and a standard OS.

The special-purpose network device 502 includes networking hardware 510 comprising compute resource(s) 512 (which typically include a set of one or more processors), forwarding resource(s) 514 (which typically include one or more ASICs and/or network processors), and physical network interfaces (NIs) 516 (sometimes called physical ports), as well as non-transitory machine readable storage media 518 having stored therein networking software 520. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 500A-H. Network software 520 further includes Dynamic Reroute Manager 521, which when executed on hardware 510 enables the network device 502 to perform the operations described with reference to FIGS. 1A-4. During operation, the networking software 520 may be executed by the networking hardware 510 to instantiate a set of one or more networking software instance(s) 522 including the Dynamic Reroute Instances (533A-R). Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A).

The special-purpose network device 502 is often physically and/or logically considered to include: 1) a ND control plane 524 (sometimes referred to as a control plane) comprising the compute resource(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the compute resource(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

Figure 5B:
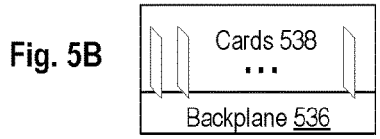
FIG. 5B illustrates an exemplary way to implement a special-purpose network device according to some embodiments of the invention.

FIG. 5B illustrates an exemplary way to implement the special-purpose network device 502 according to some embodiments of the invention. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein software 550. Software 550 further includes Dynamic Reroute Manager 551, which when executed on hardware 540 enables the network device 504 to perform the operations described with reference to FIGS. 1A-4. During operation, the processor(s) 542 execute the software 550 to instantiate one or more sets of one or more applications 564A-R. While one embodiment does not implement virtualization, alternative embodiments may use different forms of virtualization. For example, in one such alternative embodiment the virtualization layer 554 represents the kernel of an operating system (or a shim executing on a base operating system) that allows for the creation of multiple instances 562A-R called software containers that may each be used to execute one (or more) of the sets of applications 564A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 554 represents a hypervisor (sometimes referred to as a virtual machine monitor (VMM)) or a hypervisor executing on top of a host operating system, and each of the sets of applications 564A-R is run on top of a guest operating system within an instance 562A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 540, directly on a hypervisor (in which case the unikernel is sometimes described as running within a LibOS virtual machine), or in a software container, embodiments can be implemented fully with unikernels running directly on a hypervisor represented by virtualization layer 554, unikernels running within software containers represented by instances 562A-R, or as a combination of unikernels and the above-described techniques (e.g., unikernels and virtual machines both run directly on a hypervisor, unikernels and sets of applications that are run in different software containers).

The instantiation of the one or more sets of one or more applications 564A-R, as well as virtualization if implemented, are collectively referred to as software instance(s) 552. Each set of applications 564A-R, corresponding virtualization construct (e.g., instance 562A-R) if implemented, and that part of the hardware 540 that executes them (be it hardware dedicated to that execution and/or time slices of hardware temporally shared), forms a separate virtual network element(s) 560A-R.

The virtual network element(s) 560A-R perform similar functionality to the virtual network element(s) 530A-R—e.g., similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 562A-R to VNEs also apply to embodiments where such a finer level of granularity and/or unikernels are used.

In certain embodiments, the virtualization layer 554 includes a virtual switch that provides similar forwarding services as a physical Ethernet switch. Specifically, this virtual switch forwards traffic between instances 562A-R and the NIC(s) 544, as well as optionally between the instances 562A-R; in addition, this virtual switch may enforce network isolation between the VNEs 560A-R that by policy are not permitted to communicate with each other (e.g., by honoring virtual local area networks (VLANs)).

The third exemplary ND implementation in FIG. 5A is a hybrid network device 506, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

Figure 5C:
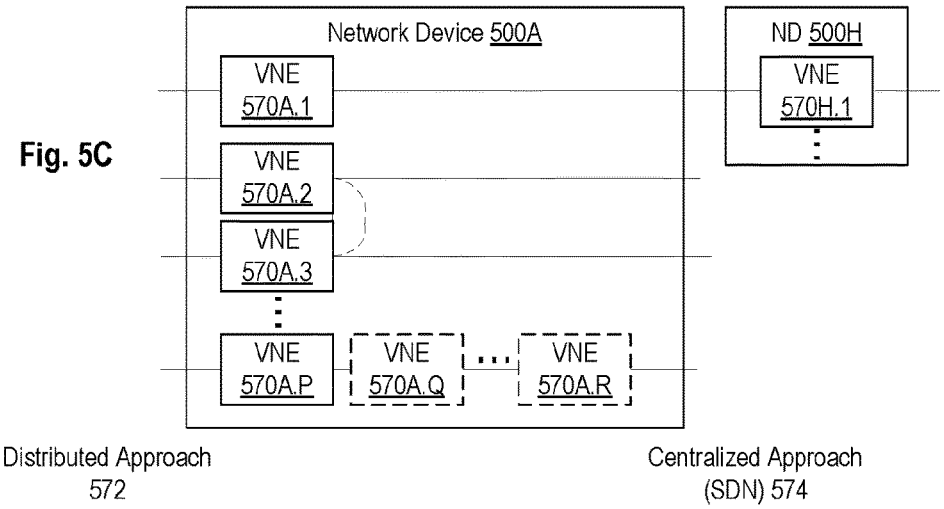
FIG. 5C illustrates various exemplary ways in which virtual network elements (VNEs) may be coupled according to some embodiments of the invention.

FIG. 5C illustrates various exemplary ways in which VNEs may be coupled according to some embodiments of the invention. FIG. 5C shows VNEs 570A.1-570A.P (and optionally VNEs 570A.Q-570A.R) implemented in ND 500A and VNE 570H.1 in ND 500H. In FIG. 5C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service—e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top network device network devices, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the software instances 562A-R may operate as servers; the same would be true for the hybrid network device 506; in the case of the special-purpose network device 502, one or more such servers could also be run on a virtualization layer executed by the compute resource(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 5D:
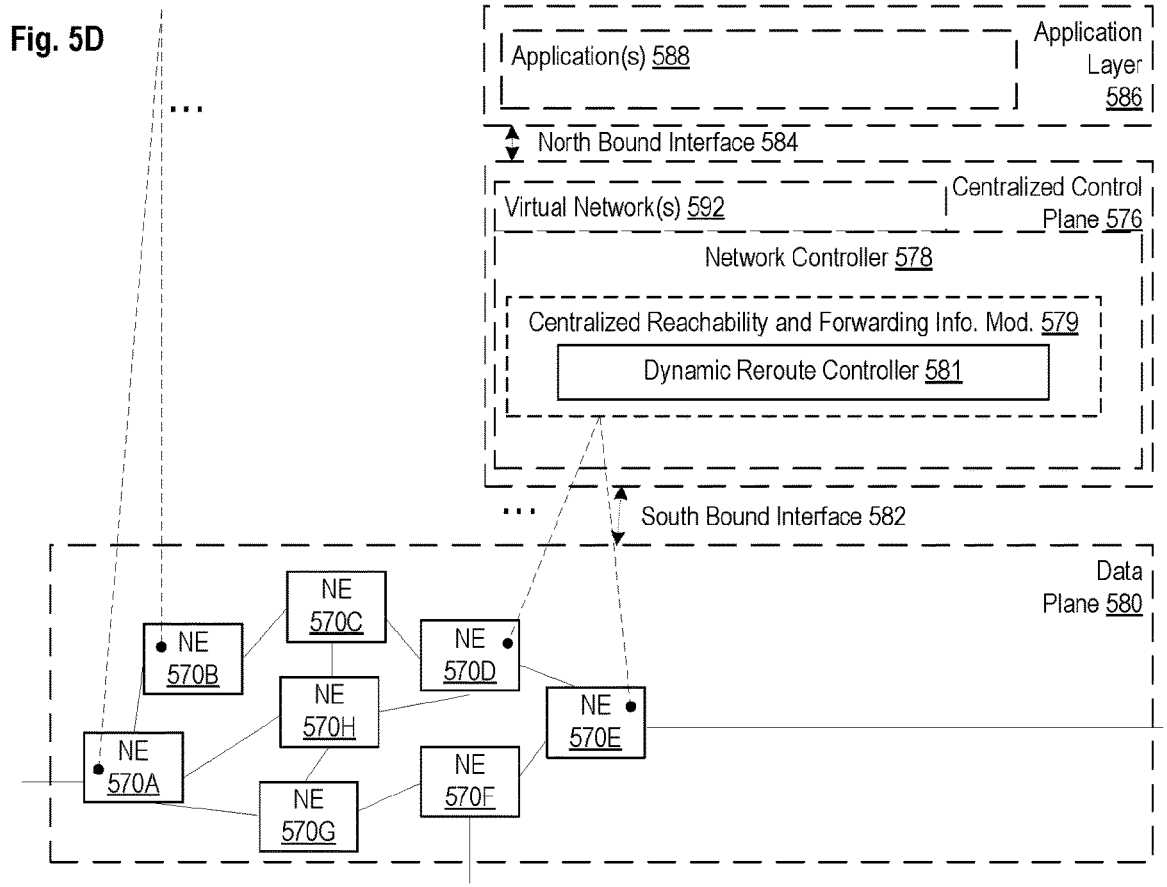
FIG. 5D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 5D illustrates a network with a single network element on each of the NDs of FIG. 5A, and within this straight forward approach contrasts a traditional distributed approach (commonly used by traditional routers) with a centralized approach for maintaining reachability and forwarding information (also called network control), according to some embodiments of the invention. Specifically, FIG. 5D illustrates network elements (NEs) 570A-H with the same connectivity as the NDs 500A-H of FIG. 5A.

FIG. 5D illustrates that the distributed approach 572 distributes responsibility for generating the reachability and forwarding information across the NEs 570A-H; in other words, the process of neighbor discovery and topology discovery is distributed.

For example, where the special-purpose network device 502 is used, the control communication and configuration module(s) 532A-R of the ND control plane 524 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 570A-H (e.g., the compute resource(s) 512 executing the control communication and configuration module(s) 532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 524. The ND control plane 524 programs the ND forwarding plane 526 with information (e.g., adjacency and route information) based on the routing structure(s). For example, the ND control plane 524 programs the adjacency and route information into one or more forwarding table(s) 534A-R (e.g., Forwarding Information Base (FIB), Label Forwarding Information Base (LFIB), and one or more adjacency structures) on the ND forwarding plane 526. For layer 2 forwarding, the ND can store one or more bridging tables that are used to forward data based on the layer 2 information in that data. While the above example uses the special-purpose network device 502, the same distributed approach 572 can be implemented on the general purpose network device 504 and the hybrid network device 506.

FIG. 5D illustrates that a centralized approach 574 (also known as software defined networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol). Thus, the network intelligence is centralized in the centralized control plane 576 executing on electronic devices that are typically separate from the NDs.

For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the compute resource(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 which includes the dynamic reroute controller 571 (it should be understood that in some embodiments of the invention, the control communication and configuration module(s) 532A-R, in addition to communicating with the centralized control plane 576, may also play some role in determining reachability and/or calculating forwarding information—albeit less so than in the case of a distributed approach; such embodiments are generally considered to fall under the centralized approach 574, but may also be considered a hybrid approach).

While the above example uses the special-purpose network device 502, the same centralized approach 574 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments of the invention, the VNEs 560A-R, in addition to communicating with the centralized control plane 576, may also play some role in determining reachability and/or calculating forwarding information—albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5D also shows that the centralized control plane 576 has a north bound interface 584 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 5D shows the distributed approach 572 separate from the centralized approach 574, the effort of network control may be distributed differently or the two combined in certain embodiments of the invention. For example: 1) embodiments may generally use the centralized approach (SDN) 574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 574, but may also be considered a hybrid approach.

While FIG. 5D illustrates the simple case where each of the NDs 500A-H implements a single NE 570A-H, it should be understood that the network control approaches described with reference to FIG. 5D also work for networks where one or more of the NDs 500A-H implement multiple VNEs (e.g., VNEs 530A-R, VNEs 560A-R, those in the hybrid network device 506). Alternatively or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

Figure 5E:
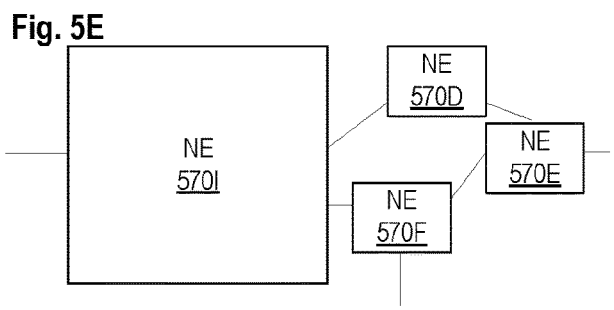
FIG. 5E illustrates the simple case of where each of the NDs implements a single NE, but a centralized control plane has abstracted multiple of the NEs in different NDs into (to represent) a single NE in one of the virtual network(s), according to some embodiments of the invention.
Figure 5F:
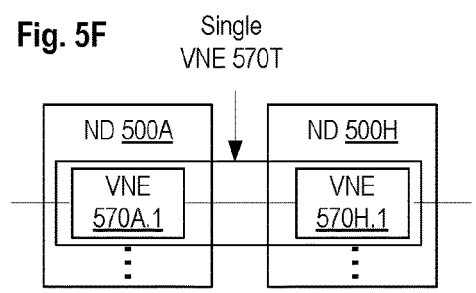
FIG. 5F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 5E and 5F respectively illustrate exemplary abstractions of NEs and VNEs that the network controller 578 may present as part of different ones of the virtual networks 592. FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 570I in one of the virtual network(s) 592 of FIG. 5D, according to some embodiments of the invention. FIG. 5E shows that in this virtual network, the NE 570I is coupled to NE 570D and 570F, which are both still coupled to NE 570E.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments of the invention. Thus, the abstraction of a NE or VNE can span multiple NDs.

While some embodiments of the invention implement the centralized control plane 576 as a single entity (e.g., a single instance of software running on a single electronic device), alternative embodiments may spread the functionality across multiple entities for redundancy and/or scalability purposes (e.g., multiple instances of software running on different electronic devices).

Figure 6:
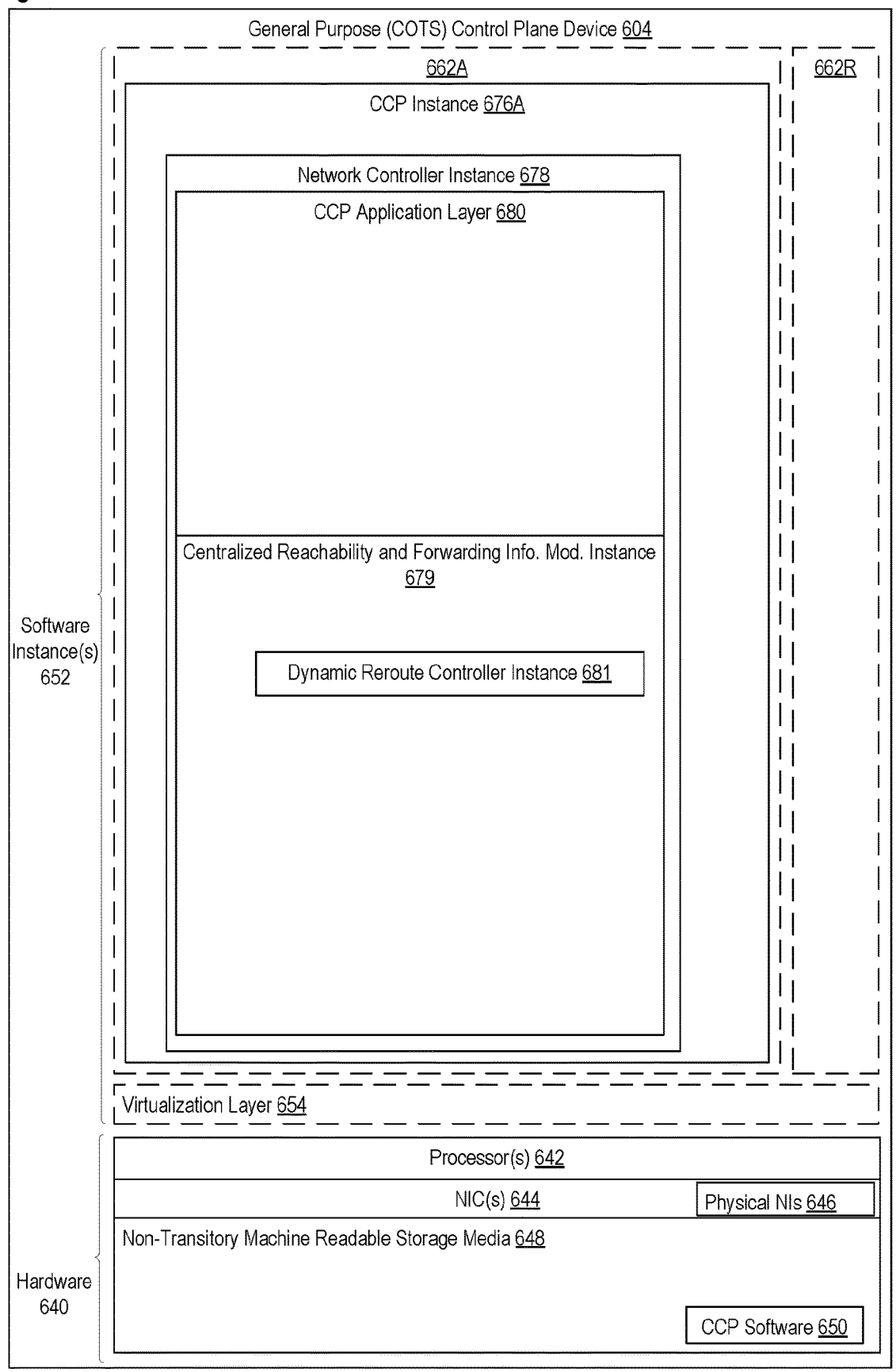
FIG. 6 illustrates a general purpose control plane device with centralized control plane (CCP) software 650), according to some embodiments of the invention.

Similar to the network device implementations, the electronic device(s) running the centralized control plane 576, and thus the network controller 578 including the centralized reachability and forwarding information module 579, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 6 illustrates, a general purpose control plane device 604 including hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein centralized control plane (CCP) software 650.

In embodiments that use compute virtualization, the processor(s) 642 typically execute software to instantiate a virtualization layer 654 (e.g., in one embodiment the virtualization layer 654 represents the kernel of an operating system (or a shim executing on a base operating system) that allows for the creation of multiple instances 662A-R called software containers (representing separate user spaces and also called virtualization engines, virtual private servers, or jails) that may each be used to execute a set of one or more applications; in another embodiment the virtualization layer 654 represents a hypervisor (sometimes referred to as a virtual machine monitor (VMM)) or a hypervisor executing on top of a host operating system, and an application is run on top of a guest operating system within an instance 662A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 640, directly on a hypervisor represented by virtualization layer 654 (in which case the unikernel is sometimes described as running within a LibOS virtual machine), or in a software container represented by one of instances 662A-R). Again, in embodiments where compute virtualization is used, during operation an instance of the CCP software 650 (illustrated as CCP instance 676A) is executed (e.g., within the instance 662A) on the virtualization layer 654. In embodiments where compute virtualization is not used, the CCP instance 676A is executed, as a unikernel or on top of a host operating system, on the "bare metal" general purpose control plane device 604. The instantiation of the CCP instance 676A, as well as the virtualization layer 654 and instances 662A-R if implemented, are collectively referred to as software instance(s) 652.

In some embodiments, the CCP instance 676A includes a network controller instance 678. The network controller instance 678 includes a centralized reachability and forwarding information module instance 679 (which is a middleware layer providing the context of the network controller 578 to the operating system and communicating with the various NEs), and an CCP application layer 680 (sometimes referred to as an application layer) over the middleware layer (providing the intelligence required for various network operations such as protocols, network situational awareness, and user—interfaces). At a more abstract level, this CCP application layer 680 within the centralized control plane 576 works with virtual network view(s) (logical view(s) of the network) and the middleware layer provides the conversion from the virtual networks to the physical view. The network controller instance further includes Dynamic Reroute Controller Instance 681, which enables the control plane device 604 to perform operations described with reference to FIGS. 1A-4.

The centralized control plane 576 transmits relevant messages to the data plane 580 based on CCP application layer 680 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions.

Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 580, the packet (or a subset of the packet header and content) is typically forwarded to the centralized control plane 576. The centralized control plane 576 will then program forwarding table entries into the data plane 580 to accommodate packets belonging to the flow of the unknown packet. Once a specific forwarding table entry has been programmed into the data plane 580 by the centralized control plane 576, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

Some NDs include functionality for authentication, authorization, and accounting (AAA) protocols (e.g., RADIUS (Remote Authentication Dial-In User Service), Diameter, and/or TACACS+ (Terminal Access Controller Access Control System Plus). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

Certain NDs (e.g., certain edge NDs) internally represent end user devices (or sometimes customer premise equipment (CPE) such as a residential gateway (e.g., a router, modem)) using subscriber circuits. A subscriber circuit uniquely identifies within the ND a subscriber session and typically exists for the lifetime of the session. Thus, a ND typically allocates a subscriber circuit when the subscriber connects to that ND, and correspondingly de-allocates that subscriber circuit when that subscriber disconnects. Each subscriber session represents a distinguishable flow of packets communicated between the ND and an end user device (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for digital subscriber line (DSL) services and requires installation of a PPP client that enables the subscriber to enter a username and a password, which in turn may be used to select a subscriber record. When DHCP is used (e.g., for cable modem services), a username typically is not provided; but in such situations other information (e.g., information that includes the MAC address of the hardware in the end user device (or CPE)) is provided. The use of DHCP and CLIPS on the ND captures the MAC addresses and uses these addresses to distinguish subscribers and access their subscriber records.

A virtual circuit (VC), synonymous with virtual connection and virtual channel, is a connection oriented communication service that is delivered by means of packet mode communication. Virtual circuit communication resembles circuit switching, since both are connection oriented, meaning that in both cases data is delivered in correct order, and signaling overhead is required during a connection establishment phase. Virtual circuits may exist at different layers. For example, at layer 4, a connection oriented transport layer datalink protocol such as Transmission Control Protocol (TCP) may rely on a connectionless packet switching network layer protocol such as IP, where different packets may be routed over different paths, and thus be delivered out of order. Where a reliable virtual circuit is established with TCP on top of the underlying unreliable and connectionless IP protocol, the virtual circuit is identified by the source and destination network socket address pair, i.e. the sender and receiver IP address and port number. However, a virtual circuit is possible since TCP includes segment numbering and reordering on the receiver side to prevent out-of-order delivery. Virtual circuits are also possible at Layer 3 (network layer) and Layer 2 (datalink layer); such virtual circuit protocols are based on connection oriented packet switching, meaning that data is always delivered along the same network path, i.e. through the same NEs/VNEs. In such protocols, the packets are not routed individually and complete addressing information is not provided in the header of each data packet; only a small virtual channel identifier (VCI) is required in each packet; and routing information is transferred to the NEs/VNEs during the connection establishment phase; switching only involves looking up the virtual channel identifier in a table rather than analyzing a complete address. Examples of network layer and datalink layer virtual circuit protocols, where data always is delivered over the same path: X.25, where the VC is identified by a virtual channel identifier (VCI); Frame relay, where the VC is identified by a VCI; Asynchronous Transfer Mode (ATM), where the circuit is identified by a virtual path identifier (VPI) and virtual channel identifier (VCI) pair; General Packet Radio Service (GPRS); and Multiprotocol label switching (MPLS), which can be used for IP over virtual circuits (Each circuit is identified by a label).

Certain NDs (e.g., certain edge NDs) use a hierarchy of circuits. The leaf nodes of the hierarchy of circuits are subscriber circuits. The subscriber circuits have parent circuits in the hierarchy that typically represent aggregations of multiple subscriber circuits, and thus the network segments and elements used to provide access network connectivity of those end user devices to the ND. These parent circuits may represent physical or logical aggregations of subscriber circuits (e.g., a virtual local area network (VLAN), a permanent virtual circuit (PVC) (e.g., for Asynchronous Transfer Mode (ATM)), a circuit-group, a channel, a pseudo-wire, a physical NI of the ND, and a link aggregation group). A circuit-group is a virtual construct that allows various sets of circuits to be grouped together for configuration purposes, for example aggregate rate control. A pseudo-wire is an emulation of a layer 2 point-to-point connection-oriented service. A link aggregation group is a virtual construct that merges multiple physical NIs for purposes of bandwidth aggregation and redundancy. Thus, the parent circuits physically or logically encapsulate the subscriber circuits.

Each VNE (e.g., a virtual router, a virtual bridge (which may act as a virtual switch instance in a Virtual Private LAN Service (VPLS) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Some NDs provide support for implementing VPNs (Virtual Private Networks) (e.g., Layer 2 VPNs and/or Layer 3 VPNs). For example, the ND where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other NDs). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge ND that supports multiple VNEs may be deployed as a PE; and a VNE may be configured with a VPN protocol, and thus that VNE is referred as a VPN VNE.

Some NDs provide support for VPLS (Virtual Private LAN Service). For example, in a VPLS network, end user devices access content/services provided through the VPLS network by coupling to CEs, which are coupled through PEs coupled by other NDs. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow end use devices that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an attachment circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudowires and attachment circuits. PEs forward frames (received from CEs) to destinations (e.g., other CEs, other PEs) based on the MAC destination address field included in those frames.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a first network device coupled with a second network device, wherein the first network device and the second network device are part of a redundancy system, and wherein the first network device is acting as an active network device in the redundancy system, the method comprising:
   receiving a first packet at a first network interface of the first network device, wherein the first packet includes a first Internet Protocol (IP) header and a first payload, wherein the first network interface couples the first network device with a customer network device;
   decapsulating the first packet to retrieve the first payload, wherein the first payload includes a second payload, and a second header including a second IP address as a destination address, and wherein the second IP address is associated with a second network interface of the first network device and the second IP address is further associated with a third network interface of the second network device;
   determining whether a slate of a link that couples the first network device with a third network device is active;
   responsive to determining that the state of the link is active causing the second payload to be forwarded towards the third network device through the second network interface of the first network device based on the second IP address; and
   responsive to determining that the state of the link is not active causing the second payload to be forwarded towards the third network device through the third network interface of the second network device based on the second IP address;
   wherein the second and the third network interface are virtual network interfaces of the first network device and the second network device respectively;
   wherein the link coupling the first network device to the third network device is part of a Multi-Chassis Link Aggregation Group (MC-LAG), and determining whether the state of the link is active is performed based on a Link Aggregation Control Protocol (LACP).

2. The method of claim 1, wherein the second network interface is a Layer 2 network interface and causing the second payload to be forwarded towards the third network device through the second network interface of the first network device includes: decapsulating the first payload to retrieve the second payload, wherein the second payload includes a layer 2 data packet; and forwarding the second payload over the layer 2 network interface of the first network device coupling the first network device to the third network device.

3. The method of claim 1, wherein the second network interface is a first loopback interface of the first network device associated with the second IP address and with the third network device, and the third network interface is a second loopback interface of the second network device associated with the second IP address and with the third network device.

4. A first network device to be coupled with a second network device, wherein the first network device and the second network device are part of a redundancy system, and wherein the first network device is acting as an active network device in the redundancy system, the first network device comprising:
one or more processors and a non-transitory computer readable storage medium, said non-transitory computer readable storage medium containing instructions, which when executed by the one or more processors, causes the first network device to:
receive a first packet at a first network interface of the first network device, wherein the first packet includes a first Internet Protocol (IP) header and a first payload, wherein the first network interface couples the first network device with a customer network device,
decapsulate the first packet to retrieve the first payload, wherein the first payload includes a second header and a second payload, and wherein the second payload includes a second IP address as a destination address, wherein the second IP address is associated with a second network interface of the first network device and the second IP address is further associated with a third network interface of the second network device,
determine whether a state of a link that couples the first network device with a third network device is active,
responsive to determining that the state of the link is active, cause the second payload to be forwarded towards the third network device through the second network interface of the first network device based on the second IP address, and
responsive to determining that the state of the link is not active, cause the second payload to be forwarded towards the third network device through the third network interface of the second network device based on the second IP address;
wherein the second and the third network interface are virtual network interfaces of the first network device and the second network device respectively;
wherein the link coupling the first network device to the third network device is part of a Multi-Chassis Link Aggregation Group (MCLAG), and to determine whether the state of the link is active is performed based on a Link Aggregation Control Protocol (LACP).

5. The first network device of claim 4, wherein the second network interface is a Layer 2 network interface and to cause the second payload to be forwarded towards the third network device through the second network interface of the first network device includes:
to decapsulate the first payload to retrieve the second payload, wherein the second payload includes a layer 2 data packet; and
to forward the second payload over the layer 2 network interface of the first network device coupling the first network device to the third network device.

6. The first network device of claim 4, wherein the second network interface is a first loopback interface of the first network device associated with the second IP address and with the third network device, and the third network interface is a second loopback interface of the second network device associated with the second IP address and with the third network device.

7. A non-transitory computer readable storage medium containing instructions, which when executed by one or more processors of a first network device to be coupled with a second network device, wherein the first network device and the second network device are part of a redundancy system, and wherein the first network device is acting as an active network device in the redundancy system, causes the first network device to perform operations comprising:
receiving a first packet at a first network interface of the first network device, wherein the first packet includes a first Internet Protocol (P) header and a first payload, wherein the first network interface couples the first network device with a customer network device,
decapsulating the first packet to retrieve the first payload, wherein the first payload includes a second header and a second payload, and wherein the second payload includes a second IP address as a destination address, wherein the second IP address is associated with a second network interface of the first network device and the second IP address is further associated with a third network interface of the second network device,
determining whether a state of a link that couples the first network device with a third network device is active,
responsive to determining that the state of the link is active, causing the second payload to be forwarded towards the third network device through the second network interface of the first network device based on the second IP address, and
responsive to determining that the state of the link is not active, causing the second payload to be forwarded towards the third network device through the third network interface of the second network device based on the second IP address;
wherein the second and the third network interface are virtual network interfaces of the first network device and the second network device respectively;
wherein the link coupling the first network device to the third network device is part of a Multi-Chassis Link Aggregation Group (MC-LAG), and determining whether the state of the link is active is performed based on a Link Aggregation Control Protocol (LACP).

8. The non-transitory computer readable storage medium of claim 7, wherein the second network interface is a Layer 2 network interface and causing the second payload to be forwarded towards the third network device through the second network interface of the first network device includes:
decapsulating the first payload to retrieve the second payload, wherein the second payload includes a layer 2 data packet; and
forwarding the second payload over the layer 2 network interface of the first network device coupling the first network device to the third network device.

9. The non-transitory computer readable storage medium of claim 7, wherein the second network interface is a first loopback interface of the first network device associated with the second IP address and with the third network device, and the third network interface is a second loopback interface of the second network device associated with the second IP address and with the third network device.

* * * * *